Aug. 11, 1942.  W. G. SHOLLENBERGER  2,292,904
UNDERGROWTH CUTTER AND SUBSOILER
Filed Jan. 20, 1939  2 Sheets-Sheet 1
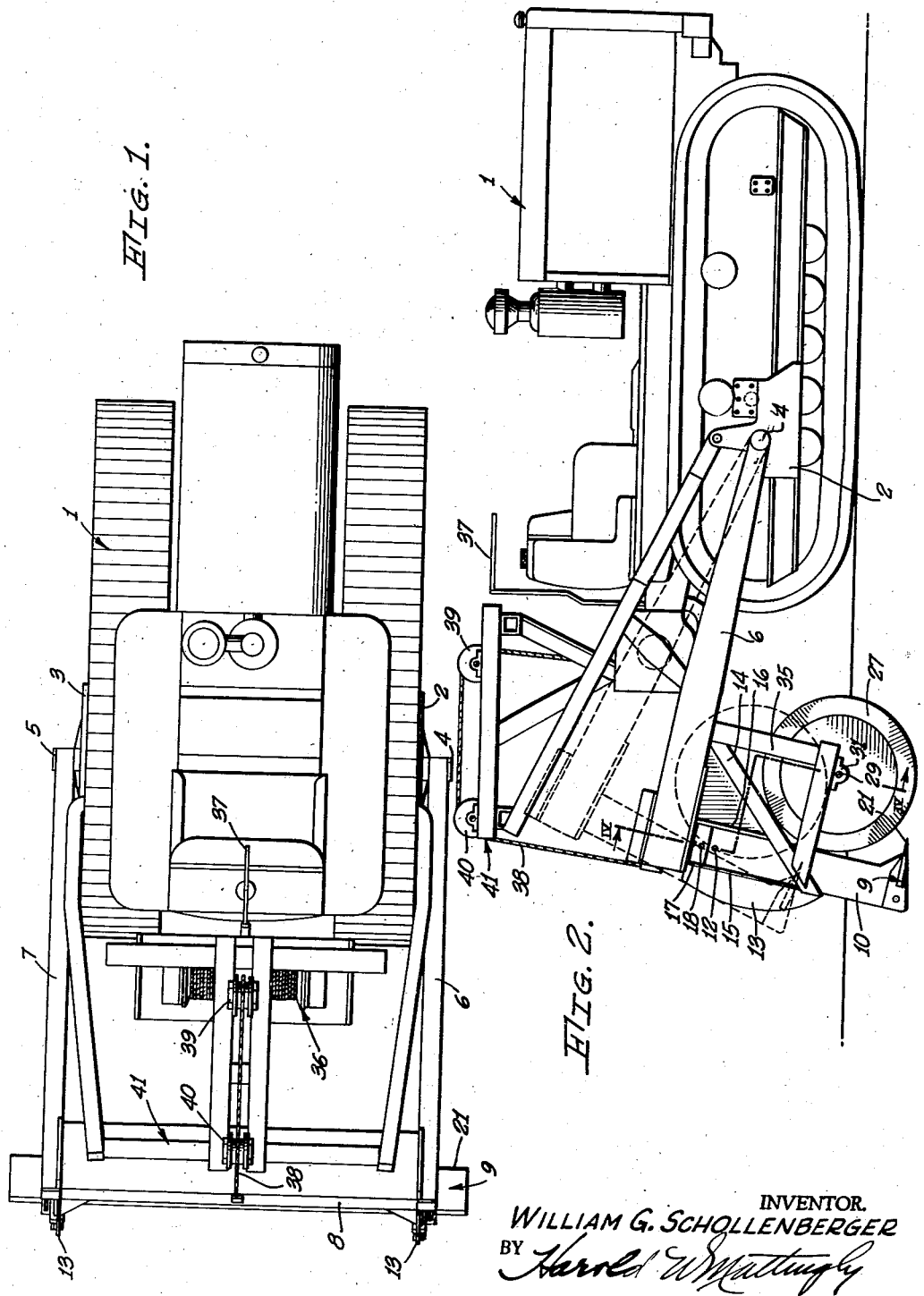
INVENTOR.
WILLIAM G. SCHOLLENBERGER
BY
ATTORNEY.

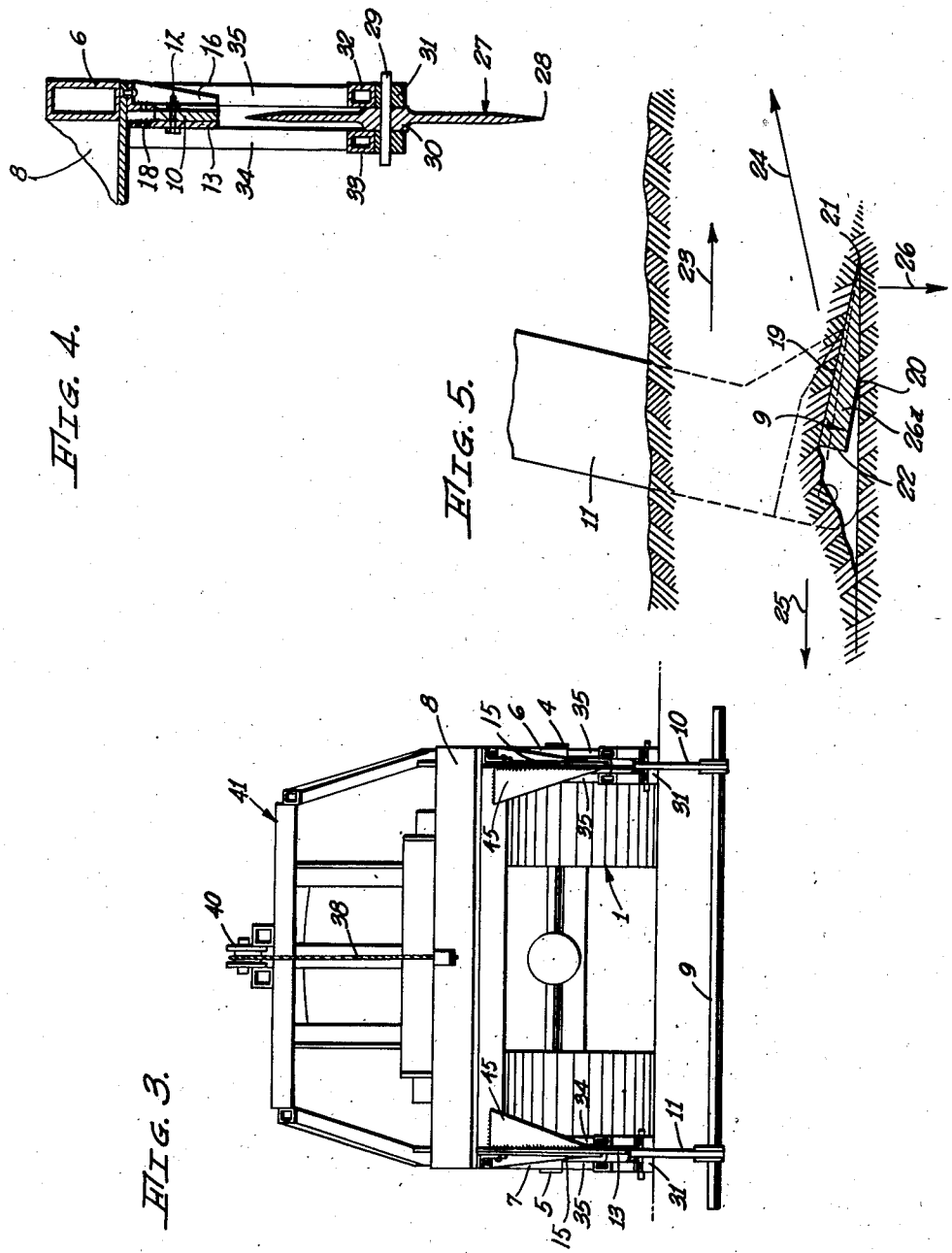

Patented Aug. 11, 1942

2,292,904

UNITED STATES PATENT OFFICE 2,292,904

UNDERGROWTH CUTTER AND SUBSOILER

William G. Shollenberger, Blythe, Calif., assignor to La Plant-Choate Mfg. Co., Inc., Cedar Rapids, Iowa, a corporation of Delaware Application January 20, 1939, Serial No. 251,967

1 Claim. (Cl. 97—47)

My invention relates to an undergrowth cutter and sub-soiler and has particular reference to a cutting tool adapted to cut the roots of undergrowth along a horizontal plane and which finds special utility when employed for clearing land of undergrowth, shrubs, small trees, and the like.

Land which is overgrown with shrubs, brush and the like must be cleared of such undergrowth before it can be used for agricultural purposes or many other purposes such as the making of parks, golf courses, highways, power line right-of-ways, etc. Until the present time the common practice employed in clearing such land consisted in cutting off the undergrowth at the ground surface, using hand tools such as axes, adzes, and brush-hooks. The cut material was then raked into piles and burned, after which the ground was plowed and re-raked in order to remove the roots. This method was expensive and required a great deal of time as a result of the hand methods employed. Furthermore, it has been found very difficult to clear out the roots by plowing since the larger roots merely deflect the plow and because of their extensive nature are not turned out to the ground surface. It has also been often found necessary, particularly when the land is to be used for agricultural purposes to go over the plot a third time with a sub-soiling tool to break up the hardpan and loosen the sub-soil before the land could be properly prepared for planting.

Early attempts to employ a power drawn, horizontal cutter disposed below the ground surface gave rise to a great deal of difficulty as regards the maintenance of the blade at a specified predetermined distance below the ground surface, the blade on these devices either tending to dig in or climb out to such an extent as to render the devices extremely unsatisfactory and in some cases inoperative.

It is therefore an object of my invention to provide a power drawn cutting tool adapted to cut the roots of undergrowth along a horizontal plane disposed a substantial distance below the surface of the ground.

It is an additional object of my invention to provide a cutting tool of the character set forth in the preceding paragraph which operates to break up the soil during a cutting operation.

It is also an object of my invention to provide a power drawn cutting tool of the character set forth in the preceding paragraphs with vertically extending blades disposed at each end of the horizontal blade to cut extensive horizontally extending roots lying above the cutting plane of the horizontal blade.

It is a further object of my invention to provide a tool of the character set forth hereinbefore with a means for hoisting the cutting blade to a position above the ground surface.

Other objects and advantages of my invention will be apparent from a study of the following specifications, read in connection with the accompanying drawings, wherein:

Fig. 1 is a plan view illustrating the preferred embodiment of my invention as connected to a track laying tractor;

Fig. 2 is an elevation illustrating in solid lines the position of the cutting tool of my invention when in an operating position and illustrating in dotted lines the position assumed by the parts when the device is hoisted out of the ground;

Fig. 3 is an end elevation of the cutting tool;

Fig. 4 is a detail section taken substantially along the line IV—IV of Fig. 2 to illustrate the mounting details for the vertically extending blade; and Fig. 5 is an enlarged fragmentary section illustrating the position the cutting blade assumes when automatically regulating its depth below the ground surface.

Referring to the drawings, I have illustrated in Fig. 1 the preferred embodiment of my invention as connected to a draft appliance comprising an endless belt type tractor 1. This connection may be made by providing a pair of attaching plates 2 and 3 secured to opposite sides of the tractor framework and including horizontally extending pivotal supports 4 and 5 for a pair of towing means 6 and 7. The towing means 6 and 7 preferably comprise structural members extending rearwardly of the tractor 1 and upwardly relative to the ground surface and terminating in a transversely extending tie member 8 suitably secured to the outermost ends of the members 6 and 7.

A horizontal cutting blade 9 is extended transversely of the towing means 6 and 7 and disposed below the tie means 8 to which it may be secured by means of a pair of upwardly rising support members 10 and 11 suitably secured to the blade 9 and provided with attaching means 12 for adjustably securing these members to the towing means 6 and 7. The attaching means 12 preferably engages the supports 10 and 11 with a bracing plate 13 secured to the underside of each of the towing members 6 and 7 and extending downwardly therefrom.

The bracing plate 13 is partially supported by a gusset 45 and may be additionally braced by diagonal bracing 14 which is secured at one end to each of the towing members 6 and 7 and along most of its length to the lower edge of the bracing plate 13. The bracing plate 13 is preferably provided with a pair of flange members 15 and 16 which are spanned by the diagonal brace and are spaced from each other to define a channel 17 in which the associated one of the supports 10 and 11 is slidably retained.

Adjustment of the depth to which the blade 9 will cut may be obtained by sliding the supports 10 and 11 in the channels 17 to the desired position, these members being secured in such position by passing the attaching means 12 through each of the members 10 and 11 and through one of a plurality of spaced holes 18 provided in the bracing plate 13.

As described and claimed in my copending application, Serial No. 409,952, filed September 8, 1941, the depth to which the blade will cut is determined automatically and depends upon the shape of the blade, its angle of disposition relative to its direction of travel and the angular position relative to the ground surface of a line joining the blade and the pivotal supports 4 and 5. I accordingly prefer to provide the blade 9 with a cross-section similar to that illustrated in Fig. 5 in which is shown a blade having relatively large area upper and lower surfaces 19 and 20, a cutting element or forward edge 21 and a relatively small area trailing edge surface 22. The blade 9 is illustrated in Fig. 5 in the approximate position it assumes during a cutting operation performed during a forward movement of the blade in the direction indicated by the arrow 23.

The forces acting on the blade include a forwardly and upwardly extending force indicated by the arrow 24 acting along a line extending between the blade 9 and the pivot point 5. This force is the towing force which is applied to the blade by the draft appliance or tractor 1 acting through the towing members 6 and 7 and the upwardly extending support members 10 and 11. Since the blade 9 is pivotally attached to the draft appliance 1 by means of the pivot mountings 4 and 5, the blade 9 will be maintained at a fixed distance from these pivot mountings and the forward and upward force 24 will be balanced by a horizontally extending rearward drag force, indicated by the arrow 25, and a vertically extending, downwardly acting force, indicated by the arrow 26, imposed on the blade by the pressure of the soil through which the blade is drawn. This downward component is the resultant of an upward force due to soil pressure on the under surface 20 and a downward force due to soil pressure on the upper surface 19. The downward component 26 may also represent the net vertical component acting on a blade axis 26a, this axis being so disposed that forces normal thereto are balanced when the blade is drawn through the soil in the direction of said axis.

In order for the blade to remain stationary relative to the surface of the ground the downwardly extending vertical force 26 must exactly balance the upward component of the towing force 24. This condition is obtained by disposing the axis 26a in such position that it slopes forwardly and downwardly and makes an angle with the ground surface equal to the angle between the ground surface and the line joining the blade 9 with the pivot 5 since the magnitude of the vertical force 26 is dependent upon the relation between the soil pressures on the upper surface 19 and on the lower surface 20 of the blade member 9 and these pressures are determined by the angle of attack of the blade 9 to the soil through which it is being drawn.

It is apparent that with the blade 9 mounted as shown in Fig. 5 if the blade were to be raised above the position shown, the force 24 would become more nearly horizontal so that the vertical component thereof would be reduced, while the pressure of the soil on the upper surface 19 of the blade 9 would increase so as to increase the downward force 26. The downward force 26 would thus overcome the upward component of the force 24 and cause the blade to automatically move downwardly relative to the ground surface to operate at a greater depth. In a like manner, if the blade 9 were disposed at a position lower than that illustrated in Fig. 5 the upward component of the force 24 would be correspondingly larger, while the soil pressure on the lower surface 20 of the blade 9 would increase so as to reduce the downward force 26. The resultant force would thus act upwardly, causing the blade to move upwardly through the soil until it again assumes the balanced position illustrated in Fig. 5.

It will be noted that by moving the supports 10 and 11 downwardly in their guide channels 17 that the angle between the axis 26a of the blade 9 and the line joining the blade 9 and the pivot point 5 would be increased so as to require the blade 9 to seek a lower position in the soil through which it is being drawn in order to balance the increased downward force 26. It is apparent therefore that the depth at which the cutter will operate may be adjusted within reasonable limits by moving the supporting members 10 and 11 upwardly or downwardly as desired in the guide channel 17 provided therefor.

When the blade 9 is drawn forwardly below the surface of the ground, the cutting edge 21 thereof will operate to sever the roots of undergrowth which intersects the plane along which the blade travels so that these roots may be readily raked out of the ground. It has been found, however, that a relatively large number of roots may be disposed above the plane of cutting of the blade 9 and extend laterally beyond the ends of the blade so as to effectively resist removal. In order to cut these extensive roots, I provide a pair of vertical blade members situated adjacent each end of the blade 9 and extending vertically a sufficient distance to reach from the level of the blade 9 to the ground surface.

I prefer to form these blades as disks 27 which are provided with a cutting edge 28. These disks may be mounted for rotation by means of a pivot shaft 29 passed through a hub portion 30 of each of the disks 27 and engaging bearing brackets 31. The bearing brackets 31 are preferably secured to a supporting structure which comprises a pair of substantially horizontally extending support members 32 and 33 secured at one end to the diagonal bracing members 14 and secured at the other end to a pair of upwardly extending bracing members 34 and 35 secured to the underside of the towing members 6 and 7. I prefer to make the disks 27 of a diameter such that the lowermost cutting edge will lie substantially in the cutting plane of the blade 9 with the pivot shafts 29 disposed above the ground surface when the device is in operation.

During the operation of the device for the purpose of clearing land, the blade 9 is drawn forwardly by the tractor 1 and operates to cut at its forward edge roots of undergrowth which extend transversely of the plane along which the blade 9 travels. The rotary cutter 27 positioned at either end of the blade 9 operates to cut those roots which extend beyond the path defined by the forward travel of the blade 9. The angular disposition of the blade 9 relative to the horizontal plane along which it travels provides a wedging action which breaks up the soil above the blade so that the roots in this soil are loosened and may be readily removed by any raking device which is provided with teeth penetrating below the surface of the soil so as to engage these roots and bring them to the surface. This wedging action which breaks up the soil is not only effective for facilitating the removal of the roots by a raking device but also effectively breaks up the hardpan and loosens the sub-soil so that the soil is placed in proper condition for planting without requiring an additional sub-soiling operation.

In order that the blade 9 and the supports 10 and 11 to which it is attached may be removed from below the ground surface in order to permit sharpening of the blade or the repairing of broken or damaged parts, I provide a hoisting mechanism which includes a suitable drum or cable winch 36 secured to the framework of the draft appliance 1 and provided with suitable means (not shown) for rotating the drum. In the preferred embodiment of my invention I derive the power for this operation from the engine of the tractor 1 and control the rotation of the drum by means of a suitable control lever 37. A cable 38 is wound upon the drum 36 and passed over a pair of pulleys 39 and 40 rotatably secured to a suitable supporting mechanism 41 fixedly secured to the framework of the draft appliance 1. The cable 38 is attached at its other end to the transversely extending tie member 8 so that when the drum 36 is rotated to wind the cable 38 thereon, the tie member 8 may be lifted so as to withdraw the blade 9 from the ground.

It will be seen therefore that I have provided a device which is particularly adapted for cutting the roots of undergrowth along a horizontal plane disposed below the ground surface so that the undergrowth, together with its roots may be readily and easily removed from the ground.

It will also be observed that the provision of the vertical blades for cutting the roots at the edges of the path traversed by the horizontal blade allows the removal of the undergrowth and the roots without interference from those extensive roots which would otherwise hinder this removal.

It will be further observed that the novel method of supporting the blades from the draft appliance employed to draw the blade through the ground provides for automatic adjustment of the depth to which the blade penetrates below the surface of the ground so that the necessity for positioning devices, such as wheels, runners or the like is completely obviated.

While I have shown and described the preferred embodiment of my invention, I do not desire to be limited to any of the details of construction shown or described herein, except as defined in the appended claim.

I claim:

In an undergrowth cutter adapted to be used with a tractor having ground engaging elements, the combination of towing arms extending longitudinally of the tractor and terminating at the rear thereof, means for pivotally mounting the forward end of said towing arms on the outside of said ground engaging elements, a cross beam for connecting the rear end of said towing arms together to form a supporting frame, means connected to said tractor and to said frame for pivotally swinging said frame on said tractor, a pair of spaced flange elements depending from each of said towing arms, a pair of bracing plates, one of said bracing plates depending from each of said towing arms and extending rearwardly from said flange elements to provide a reinforcement and secured to said flange elements to provide a channel, a blade, a pair of support members upstanding from said blade, each of said support members being slidably disposed in one of said channels, each member of one of said pairs of members having a plurality of vertically spaced apertures therein and each member of the other of said pairs of members having at least one hole therein, and attaching means in said holes and engaging selected ones of said apertures for holding said blade at any selected position below said frame.

WILLIAM G. SHOLLENBERGER.